United States Patent [19]

Aoki et al.

[11] Patent Number: 4,916,196

[45] Date of Patent: Apr. 10, 1990

[54] PROCESS FOR PRODUCING A HEAT RESISTANT RESIN COMPOSITION

[75] Inventors: Yuji Aoki, Yokkaichi; Hiroaki Miyazaki, Suzuka, both of Japan

[73] Assignee: Mitsubishi Monsanto Chemical Company, Tokyo, Japan

[21] Appl. No.: 236,525

[22] PCT Filed: Oct. 2, 1987

[86] PCT No.: PCT/JP87/00733

§ 371 Date: May 27, 1988

§ 102(e) Date: May 27, 1988

[87] PCT Pub. No.: WO88/02380

PCT Pub. Date: Apr. 7, 1988

[30] Foreign Application Priority Data

Oct. 3, 1986 [JP] Japan .................................. 61-235830

[51] Int. Cl.$^4$ .............................................. C08F 2/18
[52] U.S. Cl. ........................................ 526/79; 526/81;
526/262; 526/342; 526/347
[58] Field of Search ............... 526/262, 342, 347, 66,
526/79, 81

[56] References Cited

FOREIGN PATENT DOCUMENTS 0222924 5/1987 European Pat. Off. .
560147414A 8/1985 Japan .................................. 526/262
562068805A 3/1987 Japan .................................. 526/262

OTHER PUBLICATIONS

Chemical Abstracts, vol. 101, No. 22, 26-Nov.-1984, (Columbus, Ohio, U.S.A.), see p. 38, abstract 193041z, & JP A, 59135210 (Denki Kagaku Kogyo K.K.), Aug 3, 1984.

Chemical Abstracts, vol. 100, No. 14, 2-Apr.-1984, (Columbus, Ohio, U.S.A.), see p. 13, abstract 104081b, & JP A, 58162616 (Toray Industries, Inc.), Sep. 27, 1983.

*Primary Examiner*—Joseph L. Schofer
*Assistant Examiner*—Alex H. Walker
*Attorney, Agent, or Firm*—Oblon, Spivak, McClelland, Maier & Neustadt

[57] ABSTRACT

A process for producing a heat resistant resin composition, which comprises polymerizing by suspension polymerization a monomer mixture comprising from 30 to 80% by weight of an aromatic vinyl monomer, from 10 to 50% by weight of an N-substituted maleimide monomer, from 10 to 40% by weight of a vinyl cyanide monomer and from 0 to 30% by weight of other vinyl monomer copolymerizable therewith, characterized in that the polymerization reaction is initiated in the presence of a part of the monomer mixture and a part of a suspending agent in the suspension polymerization system prior to the initiation of the polymerization reaction, and then during the polymerization, the rest of the monomer mixture and the rest of the suspending agent are added to the polymerization system continuously or intermittently to complete the polymerization reaction.

5 Claims, No Drawings

PROCESS FOR PRODUCING A HEAT RESISTANT RESIN COMPOSITION

The present invention relates to a process for producing a heat resistant resin composition. More particularly, it relates to a process for producing a heat resistant resin composition having residues of a maleimide monomer in the molecular chains and being capable of providing a molded product having excellent transparency and mechanical strength.

For the production of styrene-type heat resistant resins having high heat distortion tempertures, a number of proposals have been made for producing copolymers comprising a styrene monomer, a maleimide monomer and a vinyl monomer copolymerizable therewith.

In general, in the copolymerization reaction of a styrene monomer with a maleimide monomer, an alternating copolymer is likely to form even when the proportion of the maleimide monomer is small, and the maleimide monomer tends to be consumed first. If the polymerization is continued further, a polymer containing a large amount of the styrene monomer will form. In such a case, the copolymer containing a large amount of the maleimide monomer formed during the earlier stage of the polymerization and the polymer of the styrene monomer formed during the later stage of the polymerization are usually poor in the compatibility to each other, and it has been difficult to obtain a resin composition capable of providing a molded product having excellent heat resistance and mechanical properties. Therefore, in order to obtain a copolymer having a uniform composition, it is necessary to conduct the polymerization reaction while continuously adding the maleimide monomer. On the other hand, if the maleimide monomer content in the formed copolymer is large, the copolymer is likely to precipitate from the styrene monomer solution, and it is impossible to conduct the polymerization reaction in a homogeneous system. In such a case, it is common to use a solvent. However, if a solvent is used, it is necessary to remove it from the polymerization system, and such is not industrially advantageous.

As a method for solving such problems, it has been proposed to conduct the copolymerization of the styrene monomer with the maleimide monomer in the presence of a vinyl cyanide monomer and conducting the polymerization reaction by adjusting the mixing proportions of the monomers to certain specific ranges, whereby a resin composition having high heat resistance with good compatibility can be obtained (Japanese Unexamined Patent Publication No. 79019/1985).

However, the method disclosed in the above-mentioned Japanese Unexamined Patent Publication No. 79019/1985 had drawbacks such that when the polymerization reaction was conducted by suspension polymerization, the suspension stability was inadequate, and the suspension system tended to be unstable whereby the polymerization reaction product tended to agglomerate, or if the suspension state was maintained, the suspending agent was likely to be included in the resulting resin composition and if such a resin composition was used as a material for a molded product, the transparency of the molded product tended to be poor. Thus, it was necessary to improve the disclosed method.

The present inventors have conducted extensive research to overcome the above drawbacks and to provide an industrially advantageous process for producing a maleimide copolymer resin composition having particularly excellent transparency in addition to excellent heat resistance and strength, and as a result, have found it possible to obtain a resin composition having the desired quality by separately adding a monomer mixture having certain specific proportions of monomers and a suspending agent to the polymerization system. The present invention has been accomplished on the basis of this discovery.

The present invention provides a process for producing a heat resistant resin composition, which comprises polymerizing by suspension polymerization a monomer mixture comprising from 30 to 80% by weight of an aromatic vinyl monomer, from 10 to 50% by weight of an N-substituted maleimide monomer, from 10 to 40% by weight of a vinyl cyanide monomer and from 0 to 30% by weight of other vinyl monomer copolymerizable therewith, characterized in that the polymerization reaction is initiated in the presence of a part of the monomer mixture and a part of a suspending agent in the suspension polymerization system prior to the initiation of the polymerization reaction, and then during the polymerization, the rest of the monomer mixture and the rest of the suspending agent are added to the polymerization system continuously or intermittently to complete the polymerization reaction.

Now, the present invention will be described in detail with reference to the preferred embodiments.

In the process of the present invention, the aromatic vinyl monomer may be at least one monomer selected from the group consisting of styrene, $\alpha$-methylstyrene, o-methylstyrene, m-methylstyrene, p-methylstyrene and chlorostyrene. Among them, styrene is particularly preferred.

The N-substituted maleimide monomer may be at least one monomer selected from the group consisting of maleimide, N-phenyl maleimide, N-(o-methylphenyl) maleimide, N-(m-methylphenyl) maleimide and N-(p-methylphenyl) maleimide. Among them, N-phenyl maleimide is particularly preferred.

The vinyl cyanide monomer may be acrylonitrile, methacrylonitrile or a mixture thereof.

Said other vinyl monomer copolymerizable with the above-mentioned monomers may be, for example, an ester of acrylic acid compounds, an ester of methacrylic acid compounds or a mixture thereof.

According to the process of the present invention, these monomers are used as a mixture. This mixture comprises from 30 to 80% by weight, preferably from 40 to 60% by weight, of the aromatic vinyl monomer, from 10 to 50% by weight, preferably from 15 to 40% by weight, of the N-substituted maleimide monomer, from 10 to 40% by weight, preferably from 15 to 35% by weight, of the vinyl cyanide monomer, and from 0 to 30% by weight of other vinyl monomer copolymerizable with these monomers. If the proportions of the monomers are outside the respective ranges, the resulting copolymer tends to be heterogeneous, and it is difficult to obtain a desired maleimide-type copolymer resin capable of providing a molded product having excellent transparency, heat resistance and mechanical properties. Particularly when the proportion of the N-substituted maleimide monomer is less than the above range, the heat resistance of the resulting maleimide copolymer resin composition will be inadequate. On the other hand, if the proportion exceeds the above range, it becomes difficult to produce a copolymer.

In the process of the present invention, a maleimide copolymer resin composition is obtained by a polymerizing a monomer mixture having the above-mentioned specific proportions by suspension polymerization. Here, the suspension polymerization is conducted by charging into a polymerizer a polymerization initiator and the monomer mixture in the presence of an inorganic or organic suspending agent and conducting the polymerization reaction in a suspended state under vigorous stirring.

As the inorganic or organic suspending agent, a conventional suspending agent for radical polymerization may be used without any particular restriction. Specifically, it includes a polyvinyl alcohol, various saponified products of vinyl acetate, an acrylic acid-2-ethylhexylacrylate copolymer, a polyacrylate, gelatin, methyl cellulose, water-insoluble carbonate, a sulfate and a phosphate. These suspending agents may be used alone or in combination as a mixture of two or more.

As to the polymerization initiator, there is no particular restriction so long as it is a radical-forming initiator. It includes an azo-type radical-forming initiator such as azobisisobutyronitrile and a peroxide-type radical-forming initiator such as benzoyl peroxide.

Further, for the control of the molecular weight of the resulting maleimide copolymer resin composition, a chain transfer agent may be employed as the case requires.

According to the process of the present invention, for the production of a maleimide copolymer resin composition by polymerizing a monomer mixture having the above-mentioned specific composition by suspension polymerization, it is essential that the polymerization reaction is initiated firstly by charging a part of the total amount of the monomer mixture and a part of the required suspending agent to the suspension polymerization system, and then during the polymerization reaction, the rest of the monomer mixture and the rest of the suspending agent are continuously or intermittently added to the polymerization system. In this manner, it is possible to suppress vigorous heat generation which occurs at the initial stage of the polymerization in a case where suspension polymerization is initiated by charging the monomer mixture all at once, and the control of the polymerization temperature is thereby simplified. Further, the suspension stability is good, and the deposit to e.g. stirring vanes in the polymerization system can be minimized. Furthermore, the amount of the suspending agent to be included in the resulting copolymer can be minimized, and the transparency of the resulting resin composition can be substantially improved.

The rest of the monomer mixture to be added is preferably in an amount within a range of from 20 to 80% by weight relative to the entire amount of the monomer mixture. If the amount is less than this range, the initial heat generation will be as vigorous as in the case where the polymerization is conducted by charging all at once, and the temperature control will be difficult. On the other hand, if the amount exceeds this range, it takes a long period of time to complete the polymerization reaction, such being undesirable.

When a molded product is prepapred from the maleimide copolymer resin composition obtained by the process of the present invention, additives such as a heat stabilizer, a light stabilizer, a lubricant, pigment, a fire retardant or a plasticizer, may be incorporated to the maleimide copolymer resin composition. Further, fiber reinforcing material such as glass fiber, metal fiber, potassium titanate whisker or carbon fiber, or filler reinforcing material such as talc, calcium carbonate, mica, glass flake, milled fiber, metal flake or metal powder, may be incorporated. In particular, a blend obtained by incorporating from 10 to 50% by weight of glass fiber to from 50 to 90% by weight of the maleimide copolymer resin composition obtained by the process of the present invention, provides a molded product having substantially improved mechanical strength and heat resistance, although the transparency will be lost.

With the foregoing construction, the present invention provides the following effects, and its value for industrial application is significant.

(1) According to the process of the present invention, the suspension stability is ensured during the polymerization step, and the deposit to the stirrer of the polymerizer is minimum, whereby the labor force for the removal thereof can be saved, such being industrially advantageous.

(2) The maleimide copolymer resin composition obtained by the process of the present invention can be molded by injection molding or extrusion molding and is suitable to obtain a molded product having excellent heat resistance, mechanical strength and transparency.

Now, the present invention will be described with reference to Examples. However, it should be understood that the present invention is by no means restricted by such specific Examples. In the following Examples, "parts" means "parts by weight".

EXAMPLE 1

Into a polymerizer equipped with a reflux condenser, a stirrer and a monomer supply device, 100 parts of deionized water having 0.03 part of a polyvinyl alcohol suspending agent dissolved, was charged. To this polymerizer, a monomer mixture comprising 30 parts of styrene, 15 parts of acrylonitrile and 20 parts of N-phenyl maleimide was further charged together with 0.4 part of Terpinolene (molecular weight modifier). While stirring the system under a nitrogen atmosphere and maintaining the temperature in the polymerizer at 60° C., 0.06 part of $\alpha,\alpha'$-azobisisobutyronitrile was added thereto as a polymerization initiator to initiate the polymerization.

Then, immediately after the initiation of the polymerization reaction, an addition from the above-mentioned monomer supply device to the polymerizer was initiated, and the rest of the monomer mixture comprising 15 parts of styrene, 10 parts of acrylonitrile and 10 parts of N-phenyl maleimide having 0.04 part of $\alpha,\alpha'$-azobisisobutyronitrile and 0.2 part of Terpinolene added, was continuously added over a period of 120 minutes. Further, upon expiration of 15 minutes from the initiation of the polymerization reaction, 0.03 part of a polyvinyl alcohol suspending agent was added to the polymerizer, and upon expiration of each of 30 minutes, 60 minutes, 90 minutes and 120 minutes from the initiation of the polymerization reaction, 0.0225 part of a polyvinyl alcohol suspending agent was added to the polymerizer. During this period, the temperature of the polymerization system was maintained at 60° C.

Upon expiration of 180 minutes from the initiation of the polymerization, 0.03 part of an acrylic acid-2-ethylhexylacrylate copolymer (suspending agent) and 0.26 part of sodium sulfate were added to the polymerizer, and the temperature of the polymerization system was raised to 75° C. over a period of 30 minutes. Then, the polymerization reaction was continued at that temperature for 120 minutes. Then, the temperature of the polymerization system was raised to 80° C., and the polymerization reaction was conducted for 120 minutes while conducting stripping under a nitrogen atmosphere. A slurry of the formed copolymer resin composition was subjected to filtration, dewatered and dried to obtain 86.5 parts by weight of a beadlike maleimide copolymer resin composition.

To the maleimide copolymer resin composition thus obtained, 0.1 part by weight of each of stearyl-$\beta$-(3,5-di-t-butyl-4-hydroxyphenyl) propionate (antioxidant) and magnesium stearate (lubricant) were added relative to 100 parts by weight of the resin composition, and the mixture was kneaded while deaerating by an extruder with a vent and pelletized, and then molded by an injection molding machine to obtain test specimens. By using the test specimens, the physical properties were evaluated. The results are shown in Table 2.

EXAMPLE 2

A beadlike maleimide copolymer resin composition was prepared in the same manner as in Example 1 except that the amount of Terpinolene added as a molecular weight modifier to the monomer mixture prior to the initiation of the polymerization was changed to 0.5 part and the amount of terpinolene added to the rest of the monomer mixture was changed to 0.3 part.

The resin composition was formed into test specimens in the same manner as in Example 1. By using the test specimens, the physical properties were evaluated. The results are shown in Table 2.

COMPARATIVE EXAMPLE 1

Into a polymerizer equipped with a reflux condenser and a stirrer, 100 parts of deionized water having 0.15 part of a polyvinyl alcohol suspending agent dissolved, was charged. To this polymerizer, a monomer mixture comprising 45 parts of styrene, 30 parts of N-phenyl maleimide and 25 parts of acrylonitrile was charged together with 0.6 part of Terpinolene. While stirring the system under a nitrogen atmosphere and maintaining the temperature in the polymerizer at 60° C., 0.1 part of $\alpha,\alpha'$-azobisisobutyronitrile was added thereto as a polymerization initiator to initiate the polymerization reaction.

Upon expiration of 180 minutes after the initiation of the polymerization reaction, 0.03 part of an acrylic acid-2-ethylhexylacrylate (suspending agent) and 0.26 part of sodium sulfate were added to the polymerizer, and the temperature of the polymerization system was raised to 75° C. over a period of 30 minutes. The polymerization reaction was continued at the same temperature for 120 minutes. Then, the temperature of the polymerization system was raised to 80° C., and the polymerization reaction was conducted for 120 minutes while conducting stripping under a nitrogen atmosphere. The slurry of the formed polymer was subjected to filtration, dewatered and dried to obtain a beadlike maleimide copolymer resin composition.

Test specimens were prepared in the same manner as in Example 1 by incorporating an antioxidant and a lubricant to the maleimide copolymer resin composition thus obtained. By using the test specimens, the physical properties were evaluated. The results are shown in Table 2.

COMPARATIVE EXAMPLE 2

A maleimide copolymer resin composition was prepared in the same manner as in Example 1 except that the total amount of 0.15 part of the polyvinyl alcohol suspending agent was added all at once prior to the initiation of the polymerization reaction.

Test specimens were prepared in the same manner as in Example 1 by incorporating an antioxidant and a lubricant to the resin composition thus obtained. By using the test specimens, the physical properties were evaluated. The results are shown in Table 2.

EXAMPLES 3 to 5

Beadlike maleimide copolymer resin compositions were prepared respectively in the same manner as in Example 1 except that the amount of the monomer mixture charged to the polymerizer prior to the initiation of the polymerization and the amount of the monomer mixture continuously added to the polymerizer after the initiation of the polymerization were changed to the monomer mixture proportions as identified in Table 1.

Test specimens were prepared in the same manner as in Example 1 from these resin compositions. By using the test specimens, the physical properties were evaluated, respectively. The results are shown in Table 2.

TABLE 1

| | Styrene (parts) | | N-phenyl maleimide (parts) | | Acrylonitrile (parts) | |
|---|---|---|---|---|---|---|
| Nos. | Prior to initiation of the polymerization | After initiation of the polymerization | Prior to initiation of the polymerization | After initiation of the polymerization | Prior to initiation of the polymerization | After initiation of the polymerization |
| Example 3 | 35 | 10 | 15 | 15 | 15 | 10 |
| Example 4 | 32.5 | 12.5 | 17.5 | 12.5 | 15 | 10 |
| Example 5 | 33 | 12 | 22 | 8 | 10 | 15 |

TABLE 2

| | Example | | | | | Comparative Example | |
|---|---|---|---|---|---|---|---|
| | Nos. | | | | | | |
| Items | 1 | 2 | 3 | 4 | 5 | 1 | 2 |
| Tensile strength (kg/cm$^2$) | 570 | 480 | 710 | 630 | 560 | 530 | 520 |
| Vicat softening point (°C.) | 155 | 153 | 142 | 148 | 153 | 151 | 150 |
| MFR (g/10 min.) | 1.8 | 3.2 | 3.9 | 2.3 | 2.2 | 2.5 | 2.3 |
| Light transmittance (%) | 82 | 84 | 83 | 83 | 82 | 77 | 72 |

TABLE 2-continued

| Items | Example Nos. | | | | | Comparative Example | |
|---|---|---|---|---|---|---|---|
| | 1 | 2 | 3 | 4 | 5 | 1 | 2 |
| Haze | 5.9 | 3.0 | 4.5 | 5.3 | 7.3 | 25.3 | 37.4 |
| Deposit to the stirrer during the polymerization | Small | Small | Small | Small | Small | Substantial | Substantial |

The physical properties were measured in accordance with the following methods.
(1) Tensile strength: JIS K 7113
(2) Vicat softening point: JIS K 7206, load: 5 kg.
(3) MFR (melt flow rate): JIS K 7210B, temperature: 240° C., load: 10 kg.
(4) Light transmittance and haze: By a direct reading base computer, manufactured by Suga Shikenki K.K.

From the results of Table 2, the following facts are evident.
(1) According to the process of the present invention, the suspension stability during the polymerization is good as compared with the Comparative Examples, and the deposit to the stirrer of the polymerizer is small, whereby it is possible to save the labor force for the removal of the deposit, and thus an improvement of the production efficiency can be expected.
(2) The test specimens of the Examples of the present invention are superior in the tensile strength to those of the Comparative Examples.
(3) The molded products prepared from the copolymer resin compositions obtained in the Examples of the present invention are superior in the light transmittance or the haze to those of the Comparative Examples, and they are thus suitable as transparent material.

We claim:

1. A process for producing a heat resistant resin composition, which comprises polymerizing by suspension polymerization a monomer mixture comprising from 30 to 80% by weight of an aromatic vinyl monomer, from 10 to 50% by weight of an N-substituted maleimide monomer, from 10 to 40% by weight of a vinyl cyanide monomer and from 0 to 30% by weight of other vinyl monomer copolymerizable therewith, characterized in that the polymerization reaction is initiated in the presence of a part of the monomer mixture and a part of a suspending agent in the suspension polymerization system prior to the initiation of the polymerization reaction, and then during the polymerization, the rest of the monomer mixture and the rest of the suspending agent are added to the polymerization system continuously or intermittently to complete the polymerization reaction.

2. The process for producing a heat resistant resin composition according to claim 1, wherein the aromatic vinyl monomer is at least member selected from the group consisting of styrene, α-methylstyrene, o-methylstyrene, m-methylstyrene, p-methylstyrene and chlorostyrene.

3. The process for producing a heat resistant resin composition according to claim 1, wherein the N-substituted maleimide monomer is at least one member selected from the group consisting of maleimide, N-phenyl maleimide, N-(o-methylphenyl) maleimide, N-(m-methylphenyl) maleimide and N-(p-methylphenyl) maleimide.

4. The process for producing a heat resistant resin composition according to claim 1, wherein the vinyl cyanide monomer is acrylonitrile, methacrylonitrile or a mixture thereof.

5. The process for producing a heat resistant resin composition according to claim 1, wherein the part of the monomer mixture and the part of the suspending agent present in the polymerization system prior to the initiation of the polymerization reaction are in an amount within a range of from 20 to 80% by weight of the entire amount to be used in the polymerization reaction.

* * * * *